Oct. 17, 1933.   H. W. JONKHOFF   1,930,619
BOGIE CONSTRUCTION
Filed Jan. 26, 1933

INVENTOR
HENRI W. JONKHOFF,
BY Carroll Bailey
ATTORNEY

Patented Oct. 17, 1933

1,930,619

UNITED STATES PATENT OFFICE 1,930,619

BOGIE CONSTRUCTION

Henri Wouter Jonkhoff, Dusseldorf, Germany

Application January 26, 1933. Serial No. 653,735  REISSUED

5 Claims. (Cl. 280—124)

This invention relates to improvements in bogie constructions and has for its object to ensure the even distribution of the weight of the vehicle on a plurality of road wheels, the said wheels being so mounted on the bogie as to be capable of individual rocking and/or vertical movement, so that each wheel should be able to clear obstructions without any of the other wheels being affected.

The invention relates more particularly to a swivelling bogie having a single bogie axle whereon a plurality of road wheels is mounted, each wheel being capable of performing individual rocking and/or vertical movement.

With these and other objects in view the invention comprises a swivelling bogie having a single bogie axle, oppositely directed wheel carrying arms pivotally mounted on said bogie axle one road wheel mounted on one of the wheel carrying arms and a pair of road wheels mounted on the other wheel carrying arm through the interposition of a parallel linkage suspension.

The length of the carrying arm for the single wheel is so determined as preferably to be twice that of the carrying arm for the twin wheels, so as to ensure even distribution of the weight of the vehicle on the three wheels.

According to an embodiment of the invention the carrying arm for the single wheel comprises a trunk and a tail member hinged together by means of a horizontal pivot. The trunk member is hinged to the bogie axle and the tail member carries the wheel.

The springing of the vehicle is effected by two quarter elliptical springs mounted on the trunk member of the carrying arm for the single wheel, the ends of the quarter elliptical springs bearing upon the ends of the tail member of the carrying arm for the single wheel and the carrying arm for the twin wheels respectively. In a preferred embodiment of the invention the quarter elliptical spring for the carrying arm of the twin wheels is stronger than that for the carrying arm of the single wheel.

In the accompanying drawing one form of the invention is shown diagrammatically by way of example.

Figure 1:
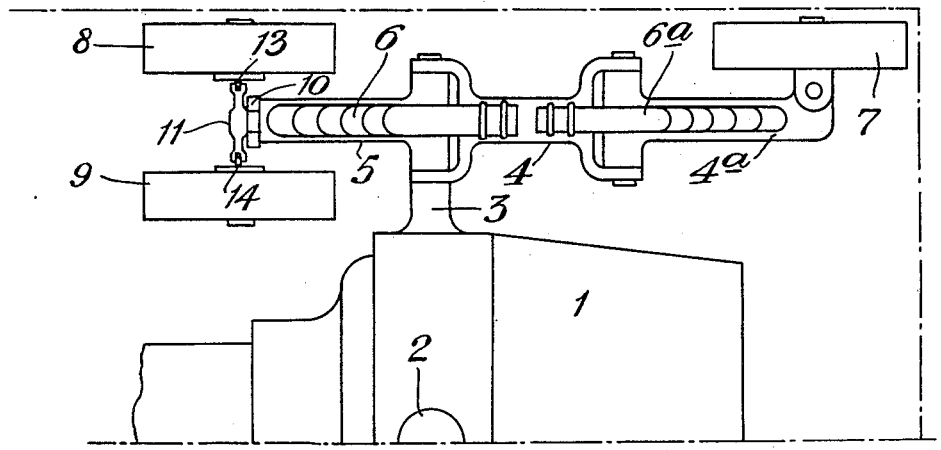
Figure 1 is a partial plan view of the improved bogie, the part not shown being exactly similar to that illustrated.
Figure 2:
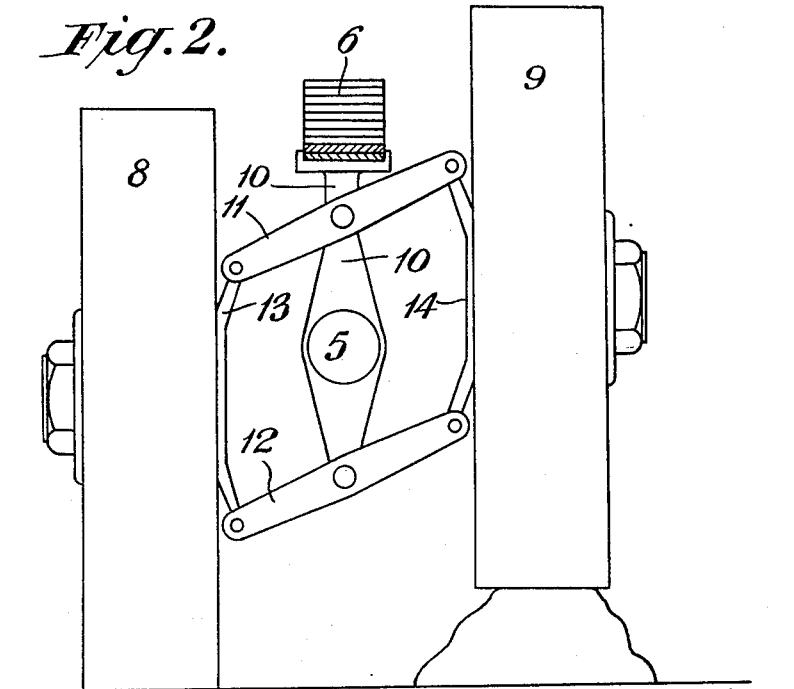
Figure 2 is a back view of the parts shown in Figure 1 on an enlarged scale.

The body 1 of the improved bogie swivels round the kingpin 2 and has a single bogie axle 3. Pivotally mounted on the bogie axle 3 there is a wheel carrying arm 4ª for a single wheel and a wheel carrying arm 5 for twin wheels. As will be seen in the drawing the carrying arm for the single wheel is made up of a trunk member 4 and a tail member 4ª, member 4 being hinged on the axle 3 and member 4ª being hinged on member 4.

On the free end of tail member 4ª of the carrying arm for the single wheel is mounted the road wheel 7 which is steerable. There are two road wheels 8 and 9 mounted on the free end of the carrying arm 5 for the twin wheels with the interposition of a parallel linkage, which will now be described in detail.

The wheel carrying arm 5 has an upwardly and downwardly extending stay 10 secured thereto in a substantially perpendicular relation. On the top and bottom extremity of the said stay 10 are pivotally mounted two armed levers 11 and 12 respectively, the arms of the said levers 11 and 12 being of the same length. The hub of each of the road wheels 8 and 9 is provided with an upwardly and downwardly extending pivot arm 13 and 14, the ends of which are in pivotal engagement with the ends of the two armed levers 11 and 12.

It will be seen that in this way a parallel linkage suspension is provided for the twin wheels 8 and 9, by virtue of which these wheels are able to move independently in the vertical direction, so that one of these wheels is able to clear an obstruction lying in its path on the road without the other wheel being affected. Another advantage of this suspension system is that the vertical movement transmitted to the vehicle proper is considerably reduced.

The springing of the vehicle is effected by two quarter elliptical springs 6 and 6ª mounted on the trunk member 4 of the carrying arm for the single wheel. It will be observed that in the embodiment shown spring 6 is stronger than spring 6ª as it has to carry greater weight. The free ends of the springs bear on the extremities of the wheel carrying arms.

As will be seen in Figure 1 the carrying arm for the single wheel is twice as long as the carrying arm for the twin wheels which results in the weight of the vehicle being evenly distributed on the single wheel and on the twin wheels.

I claim:—

1. In a swivelling bogie, a single bogie axle, a pair of wheel carrying arms each pivotally mounted at each end of said bogie axle, a single wheel mounted on one of the wheel carrying arms, twin wheels mounted on the other wheel carrying arm, a parallel linkage suspension inserted between the last mentioned wheel carrying arm and the said twin wheels and a spring mounting disposed on the wheel carrying arm for the single wheel.

2. In a swivelling bogie a single bogie axle, a pair of wheel carrying arms each pivotally mounted at each end of said bogie axle, a single wheel mounted on one of the wheel carrying arms, an upwardly and downwardly extending stay mounted on the free end of the other wheel carrying arm, a pair of two armed levers mounted on the stay a pair of road wheels and means on the hub of said pair of road wheels for the pivotal attachment of the said levers thereto.

3. In a swivelling bogie a single bogie axle, a wheel carrying arm pivotally mounted on said bogie axle and comprising a trunk member hinged to the bogie axle and a tail member hinged to the trunk member, a steerable wheel mounted on said tail member, another wheel carrying arm pivotally mounted on the bogie axle, a pair of wheels mounted on the last mentioned wheel carrying arm, and a parallel linkage suspension between the carrying arm for the pair of road wheels and the said pair of wheels.

4. In a swivelling bogie a single bogie axle, a wheel carrying arm each for a single wheel pivotally mounted at each end of said bogie axle, a carrying arm each for a pair of wheels half as long as said carrying arm for the single wheel and pivotally mounted at each end of said bogie axle, a front wheel mounted on the carrying arm for the single wheel, a pair of wheels mounted on the carrying arm for the pair of wheels and a parallel linkage suspension between the last named carrying arm and said pair of wheels.

5. In a swivelling bogie a single bogie axle, a road wheel, a carrying arm for said road wheel comprising a trunk member hinged on the bogie axle and a tail member hinged on the trunk member, a pair of road wheels, a carrying arm hinged on the bogie axle for said pair of road wheels, a parallel linkage suspension between said pair of wheels and their carrying arm, a pair of quarter elliptical springs mounted on said trunk member of the carrying arm for the single wheel, the free end of said quarter elliptical springs bearing on the extremity of said wheel carrying arms respectively.

HENRI WOUTER JONKHOFF.